Patented Dec. 11, 1951

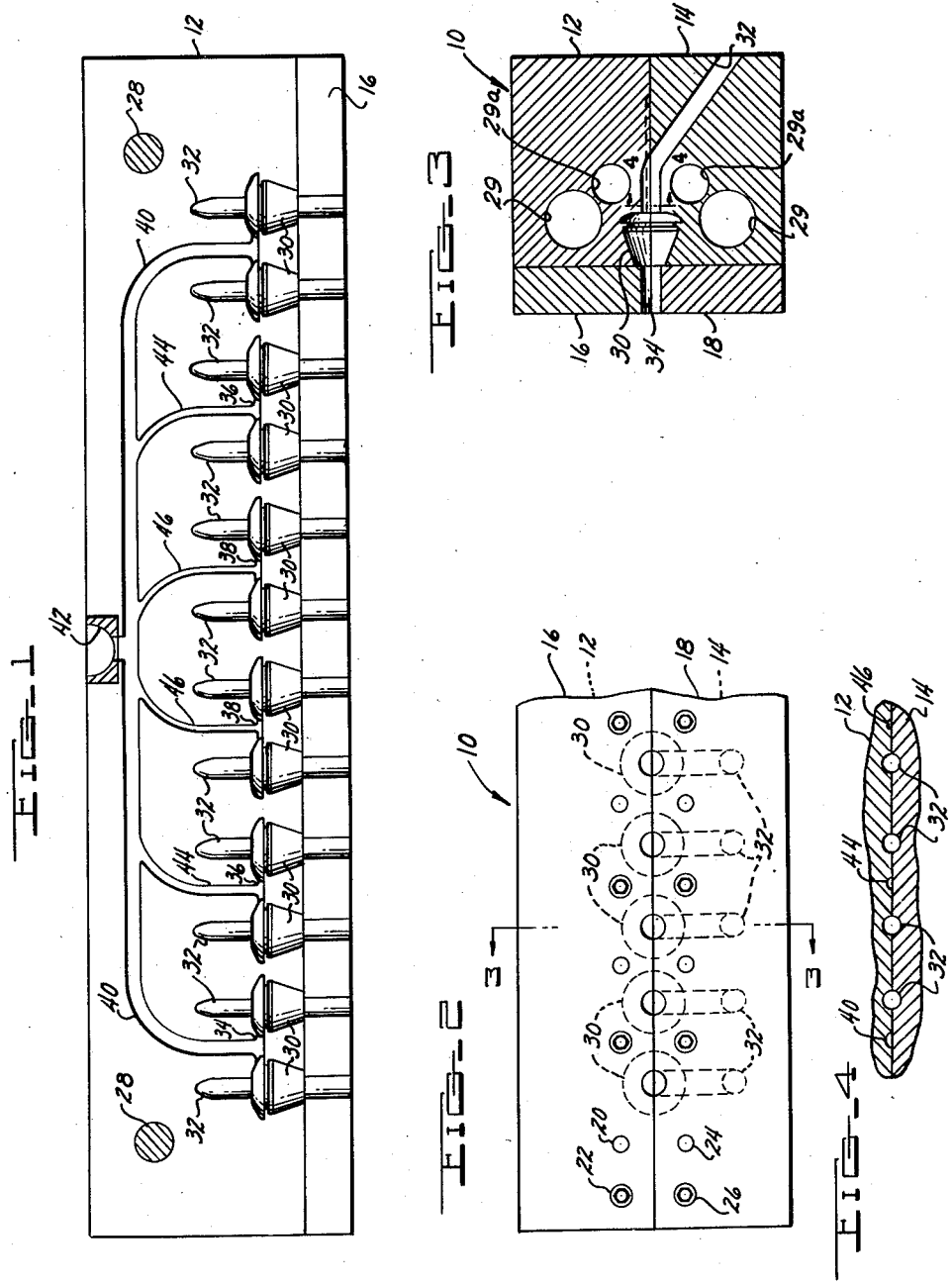

2,578,492

UNITED STATES PATENT OFFICE 2,578,492

TWELVE CAVITY GROMMET MOLD

Robert L. Simpkins, Royal Oak, John S. Materka, Dearborn, and Howard A. Elliott, Detroit, Mich., assignors to Essex Wire Corporation, Detroit, Mich., a corporation of Michigan Application March 22, 1951, Serial No. 216,924

10 Claims. (Cl. 18—42)

The present invention relates to apparatus for molding, and more particularly to injection type molds for molding grommets, terminals, spark plug insulators, or the like on electric conductors.

As is well known, in the conventional injection type molds heretofore used, runners and gates are provided for conducting plastic or rubber-like materials from the sprue to the mold cavity. When the plastic or rubber-like materials of thick dough-like consistency are injected into such molds under great pressure, their flow is slow because of great friction encountered in the relatively small runner channels. Moreover, the materials will flow into and fill the cavities nearest the sprue first, progressively filling each cavity further away. In many types of molding, this is of no consequence; but in the present field of molding terminals, grommets, spark plug insulators, or the like, it has been a serious barrier. The difficulty arises from the fact that the cavities near the sprue fill first, after which the compound exerts high pressure against the conductors in the cavities. This tends to shove the conductors, or terminal elements, or the like, out of place in the cavity, or causes the molded part to be applied at some undesirable place on the conductor because the latter has moved.

The cavities near the sprue continue to receive the high pressure, as the other cavities fill, so that this condition advances progressively away from the sprue to the end cavities which fill last, resulting in wide variation in the amount of shove due to the time element. Thus, it is found that the molded parts of the first-filled cavities will be distorted progressively more than the molded parts of each successively filled cavity.

It is the primary object of the present invention to provide a multiple cavity mold for molding grommets, terminals, spark plug insulators, or the like on electric conductors, which mold is constructed and arranged to permit plastic or rubber-like materials to be injected under pressure thereinto and to be conducted to each of its cavities so that the latter will be filled at substantially the same time, thereby preventing unnecessary pressure surges in the cavities.

It is another object of the present invention to provide a multiple cavity mold of the foregoing character in which the runners for conducting the plastic or rubber-like materials from the sprue to the cavities provides the greatest volume of flow for the minimum surface area of the runners, whereby the frictional resistance of flow will be at a minimum so that excessively high pressures will not be necessary for injecting the materials into the cavities, thereby permitting use of lower clamping pressure to hold the sections of the mold together without causing flash to form between said sections.

It is still another object of the present invention to provide a multiple cavity mold of the foregoing character in which the runners are constructed and arranged to effect a minimum heat transfer from the plastic or rubber-like material to the mold during the injection operation so that the materials will not begin to cure until they have been introduced into the cavities, thereby avoiding use of unnecessarily high injection pressure to force the partially cured material through the runner.

It is still another object of the present invention to provide an improved molding apparatus whereby a large number of grommets, terminals, spark plug insulators, or the like may be molded on electric conductors in large quantities in a more efficient manner than has heretofore been possible.

Other objects of this invention will appear in the following description and appended claims, reference being had to the accompanying drawings forming a part of this specification wherein like reference characters designate corresponding parts in the several views.

In the drawings:

Fig. 1 is a bottom view of the top section of the die with the bottom section cut away;

Fig. 2 is a fragmentary front elevational view of the sectional die;

Fig. 3 is a sectional view taken on line 3—3 of Fig. 2; and

Fig. 4 is a fragmentary sectional view taken on the line 4—4 of Fig. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, one embodiment of the present invention can be seen which is particularly adapted for use in molding grommets on electric conductors. It should be understood, however, that the invention is not limited to this particular modification, but can be used equally well for molding terminals, spark plug insulators, or the like on electric conductors.

In the embodiment of the invention shown in the drawings, a sectional die 10 is formed from a plurality of die sections 12, 14, 16, and 18. The section 16 is attached to section 12 by a plurality of dowel pins and screws as seen at 20 and 22, respectively, and the section 18 is attached to section 14 by a plurality of dowel pins and screws as at 24 and 26, respectively. If desired, sections 16 and 12 may be integral, and similarly, sections 18 and 14 may be made as a single section. However, these sections are made separately to facilitate machining the cavities, runners, and the like therein.

Extending downwardly from the upper die section 18 are dowel pins 28, which are adapted to enter sockets (not shown) of the lower die section 14 when the complemental sections are brought together, thus, to accurately align the said die sections. A pair of conventional heater elements 29 and thermostat elements 29a for regulating operation of the heater elements 29 are enclosed within the die sections 12 and 14. The heater elements 29 are used to maintain the sectional die 10 at the proper temperature so that plastic or rubber-like materials injected into said sectional die 10 will not be cured prematurely.

Formed in the upper die section 12 are a plurality of recesses which are adapted to register with and complement a similar number of recesses in the lower die section 14 to form a plurality of grommet-forming cavities 30.

Extending outwardly from one end of each of the grommet-forming cavities 30 is a wire-receiving passage 32, and another wire-receiving passage 34 extends outwardly from the other end of the grommet-forming cavities 30. By virtue of this construction, wire conductors can be passed through each of the grommet-forming cavities 30, and the wire passages 32 and 34 to permit grommets to be molded thereon.

Formed in the underface of the upper die section 12 and joining each pair of grommet-forming cavities 30, are a plurality of gates 34, 36, and 38 which are increasingly smaller in size in the order recited. Each of the gates 34 communicates with a main runner 40, which extends to and communicates with the sprue 42 through which the plastic or rubber-like material is injected under high pressure. Communicating with the gates 36 are gate runners 44, which open into the main runner 40, and communicating with the gates 38 are gate runners 46 which likewise open into the main runner 40. The surface of each of these runners is preferably polished so as to offer the least resistance to flow of the plastic or rubber-like materials which will flow therethrough.

As can best be seen in Figs. 1 and 4, the main runner 40 has a semi-circular cross section which has a uniform radius throughout and gate runners 44 and 46 are similarly formed. However, main runner 40, which provides communication between the sprue 42 and the pairs of grommet-forming cavities 30, which are farthest from said sprue have a relatively large radius, gate runner 44 which provides communication between pairs of grommet-forming cavities 30, which are closer to sprue 42 have a somewhat smaller radius, and the gate runners 46 which provide communication between the sprue 42 and the grommet-forming cavities nearest to said sprue 42 have the smallest radius of curvature. By virtue of this construction, the plastic or rubber-like materials of thick dough-like consistency can be injected through the sprue 42 and the various runners and gates into the grommet-forming cavities 30.

The cross sectional areas of the respective runners 40, 44, and 46, are uniformly decreased in size so that the injected materials will fill the cavities 30 simultaneously. Thus, the pressure in all cavities 30 during filling is balanced, and none of them will receive the full injection pressure until the instant of filling all cavities. If the injection were continued after all cavities were filled, they would, of course, be under the full nozzle pressure, and an undesirable effect of shoving the conductors or other elements being molded out of place would occur. In the present system of molding, since the cavities fill simultaneously, the injection can be carried out to any predetermined point, at which point the injection is ended. Thus, extreme pressure surges can be avoided because a predetermined point for discontinuing the injection is selected so that the cavities are filled under moderate pressure.

There are several important advantages in using the type of runners employed in the present invention over the type of runners heretofore used. Better flow in the runners is obtained because of the maximum volume to minimum perimeter relationship provided in each of the runners. This results in a two-fold advantage; first, it offers less friction to the flow of the plastic or rubber-like material, since the latter does not flow across more than the minimum metal surface of the die; and second, the material does not transfer heat readily from the die, hence avoiding having the materials reach a critical temperature in the runners which will start the cure of the material, thereby raising the viscosity of the same so as to impede its flow. As is believed understood, if the latter occurs, a much higher injection pressure will be required.

The present system also produces a minimum amount of flash because of the balanced pressures employed. Thus, waste is kept at a minimum. Further, because of this balanced pressure, it is found that a clamping pressure much lower than the conventional pressure used may be employed for holding the molds during injection and setting of the compound. The latter gain is then responsible for further gains, because it is found when using lower clamping pressures that the size of the pressure devices used may be somewhat smaller so that it is possible to economically conveyerize a mold and press for producing larger numbers of moldings in the form of an overhead conveyer. The latter can be easily handled by the operator so that he can completely operate a small unitary system for loading the mold, injecting the materials, permitting the latter to cure, and finally unloading the die. Lost motion is reduced, and a very compact, efficient system of molding is then obtained.

Having thus described our invention, we claim:

1. A molding apparatus for molding a plurality of grommets, terminals, spark plug insulators or the like on electric conductors, comprising a sectional die, a sprue formed in said sectional die, a plurality of cavities formed between adjacent sections of said die at varying distances from said sprue, a main runner of uniform cross section extending from said sprue to the cavity farthest from said sprue, gate runners extending between said main runner and each of said cavities, the cross sections of the runners leading to cavities nearest to said sprue having smaller cross sections than those farther from said sprue.

2. A molding apparatus for molding a plurality of grommets, terminals, spark plug insulators or the like on electric conductors, comprising a sectional die, a plurality of cavities formed between adjacent sections of said die at varying distances from said sprue, each of said cavities having a gate opening thereinto, a main runner of uniform cross section extending from said sprue to the gate of the cavity farthest from said sprue, gate runners each of progressively smaller cross section extending from said main runner to the gates of the remaining cavities, said gate runners decreasing in cross section in the order of nearness to said sprue, and the gates of said cavities decreasing in size progressively in the order of their nearness to said sprue.

3. A molding apparatus for molding a plurality of grommets, terminals, spark plug insulators or the like on electric terminals, comprising a sectional die, a sprue formed in said sectional die, a plurality of cavities formed in a row between adjacent sections of said die, said cavities being uniformly spaced and arranged symmetrically on opposite sides of said sprue, each of said cavities having a gate opening thereinto, a main runner of uniform cross section extending from said sprue to the gates of the cavities on opposite ends of the row, gate runners extending from said main runner to each of the gates of said cavities, the cross section of said gate runners decreasing in area progressively from the ends of the row of cavities to the middle of said row.

4. A molding apparatus for molding a plurality of grommets, terminals, spark plug insulators or the like on electric conductors, comprising a sectional die, a sprue formed in said sectional die, a plurality of cavities formed in a row between adjacent sections of said die, said cavities being uniformly spaced and symmetrically arranged on opposite sides of said sprue, each of said cavities having a gate opening thereinto, a main runner of uniform cross section extending from said sprue to the gates of the cavities on opposite ends of said row, gate runners extending from said main runner to each of the gates of said cavities, the cross section of said gate runners decreasing in area progressively from the ends of the row of cavities to the middle of said row, and the gates of said cavities also decreasing in area progressively from the ends of the row of cavities to the middle of said row.

5. A molding apparatus for molding a plurality of grommets, terminals, spark plug insulators or the like on electric conductors, comprising a sectional die, a sprue formed in said sectional die, a plurality of cavities formed in a row between adjacent sections of said die, said cavities being grouped in pairs with each group having one gate joining its cavities, a main runner of uniform cross section extending from said sprue to the group of cavities farthest from said sprue, gate runners extending from said main runner to each of the gates of said groups, the cross sectional area of each of said gate runners being proportionate to the distance its gate is from said sprue.

6. A molding apparatus for molding a plurality of grommets, terminals, spark plug insulators or the like on electric conductors, comprising a sectional die, a sprue formed in said sectional die, a plurality of cavities formed in a row between adjacent sections of said die, said cavities being grouped in pairs which are uniformly spaced and symmetrically arranged on opposite sides of said sprue, each of said groups of cavities having a gate joining its cavities, a main runner of uniform cross section extending from said sprue to the gates of the groups of cavities on opposite ends of the row, gate runners extending from said main runner to each of the gates of said groups of cavities, the cross sectional area of each of said gate runners being proportionate to the distance its gate is from said sprue.

7. A molding apparatus for molding a plurality of grommets, terminals, spark plug insulators or the like on electric conductors comprising a sectional die, a sprue formed in said sectional die, a plurality of cavities formed between adjacent sections of said die, one of said sections having a semi-circular main runner of uniform radius extending from said sprue to the cavity farthest from said sprue, said one section having semi-circular gate runners extending between the other cavities and the main runner, the radius of each of said gate runners being proportionate to the distance of its cavity from said sprue.

8. A molding apparatus for molding a plurality of grommets, terminals, spark plug insulators or the like on electric conductors comprising a sectional die, a sprue formed on said sectional die, a plurality of cavities formed in a row between adjacent sections of said die, said cavities being grouped in pairs which are uniformly spaced and symmetrically arranged on opposite sides of said sprue, each of said groups of cavities having a gate joining its cavities, one of said sections having a semi-circular main runner of uniform radius extending from said sprue to the gates of the groups of cavities on opposite ends of the row, said one section having semi-circular gate runners extending from said main runner to each of the gates of said groups of cavities, the radius of each of said gate runners being proportionate to the distance its gate is from said sprue.

9. A molding apparatus as claimed in claim 8 wherein the main gate runners have polished surfaces.

10. A molding apparatus for molding grommets, terminals, spark plug insulators or the like, over electric conductors comprising a sectional die, a sprue formed in said sectional die, a plurality of cavities formed between adjacent sections of said die, ducts in said die each communicating with one of the cavities so that electric conductors can be introduced into said cavities, one of said sections having a semi-circular main runner of uniform radius extending from said sprue to the cavity farthest from said sprue, said one section having semi-circular gate runners extending between the other cavities and the main runner, the radius of each of said gate runners being proportionate to the distance of its cavity from said sprue.

ROBERT L. SIMPKINS.
JOHN S. MATERKA.
HOWARD A. ELLIOTT.

No references cited.